United States Patent
Gabrielsson

(10) Patent No.: US 10,399,036 B2
(45) Date of Patent: Sep. 3, 2019

(54) METHOD FOR THE CLEANING OF EXHAUST GAS FROM A COMPRESSION IGNITION ENGINE

(71) Applicant: Umicore AG & Co. KG, Hanau-Wolfgang (DE)

(72) Inventor: Pär L. T. Gabrielsson, Helsingborg (SE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 15/116,347

(22) PCT Filed: Feb. 20, 2015

(86) PCT No.: PCT/EP2015/053568
§ 371 (c)(1),
(2) Date: Aug. 3, 2016

(87) PCT Pub. No.: WO2015/128247
PCT Pub. Date: Sep. 3, 2015

(65) Prior Publication Data
US 2016/0346733 A1 Dec. 1, 2016

(30) Foreign Application Priority Data
Feb. 28, 2014 (DK) .................................. 2014 70092

(51) Int. Cl.
*B01D 53/94* (2006.01)
*F01N 3/10* (2006.01)
*F01N 3/20* (2006.01)
*F01N 13/00* (2010.01)
*B01D 53/90* (2006.01)

(52) U.S. Cl.
CPC ....... *B01D 53/9418* (2013.01); *B01D 53/944* (2013.01); *B01D 53/9472* (2013.01);
(Continued)

(58) Field of Classification Search
None
See application file for complete search history.

(56) References Cited

U.S. PATENT DOCUMENTS 5,976,475 A * 11/1999 Peter-Hoblyn ......... B01D 53/90
423/212
6,491,885 B1 * 12/2002 Tokunaga .............. B01D 53/56
423/212
(Continued)

FOREIGN PATENT DOCUMENTS

EP 1 633 959 B1 5/2007
EP 2 664 379 A1 11/2013
(Continued)

OTHER PUBLICATIONS

Search Report received in RU 2016138322 dated Oct. 16, 2018.
(Continued)

*Primary Examiner* — Sheng H Davis
(74) *Attorney, Agent, or Firm* — Suzannah K. Sundby, Esq.; Canady + Lortz LLP

(57) ABSTRACT

A method for the cleaning of exhaust gas from a compression ignition engine, comprising the steps of injecting a first amount of an aqueous urea solution into the gas; in a first mode of operation and at an exhaust gas temperature of between 150 and 220° C. hydrolysing the first amount of urea to ammonia reducing agent in presence of a first catalyst comprising vanadium oxide supported on titania and subsequently removing part of nitrogen oxides contained in the exhaust gas by contacting the gas mixed with the ammonia reducing agent through a second catalyst comprising platinum on titania and/or alumina; and in a second mode of operation and at an exhaust gas temperature above 220° C. removing a part of the nitrogen oxides in presence of the first catalyst and the ammonia reducing agent and subsequently oxidising hydrocarbons, carbon monoxide and
(Continued)

Figure 3A:
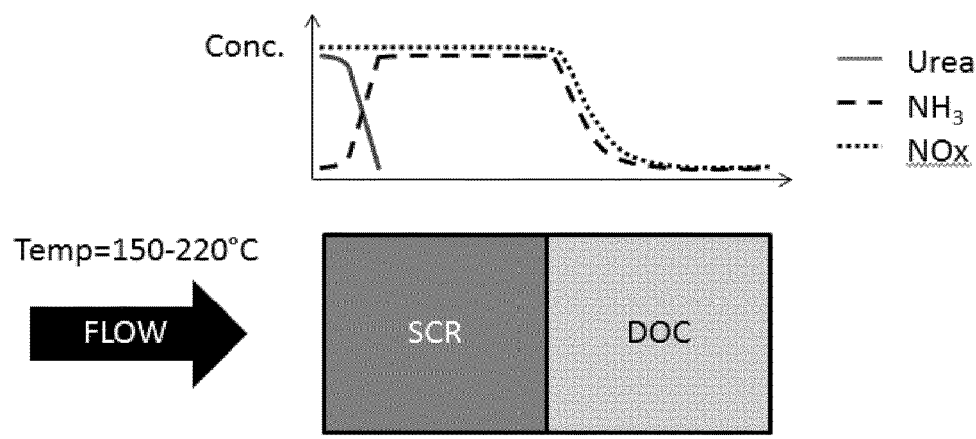

remaining amount of the ammonia reducing agent further contained in the exhaust gas by passing the gas through the second catalyst.

8 Claims, 2 Drawing Sheets

(52) U.S. Cl.
CPC ........... *F01N 3/106* (2013.01); *F01N 3/2066* (2013.01); *F01N 13/009* (2014.06); *B01D 53/90* (2013.01); *B01D 53/9477* (2013.01); *B01D 2251/2067* (2013.01); *B01D 2255/1021* (2013.01); *B01D 2255/1023* (2013.01); *B01D 2255/2092* (2013.01); *B01D 2255/20707* (2013.01); *B01D 2255/20723* (2013.01); *B01D 2255/20738* (2013.01); *B01D 2255/20761* (2013.01); *B01D 2255/20776* (2013.01); *B01D 2255/50* (2013.01); *B01D 2255/502* (2013.01); *B01D 2255/9022* (2013.01); *B01D 2255/9032* (2013.01); *B01D 2257/404* (2013.01); *B01D 2257/406* (2013.01); *B01D 2257/502* (2013.01); *B01D 2257/702* (2013.01); *F01N 2370/04* (2013.01); *F01N 2610/02* (2013.01); *Y02T 10/24* (2013.01)

(56) References Cited

U.S. PATENT DOCUMENTS

| 2003/0125202 | A1 | 7/2003 | Ruwisch | |
|---|---|---|---|---|
| 2006/0287196 | A1 | 12/2006 | Matsuo et al. | |
| 2008/0008629 | A1* | 1/2008 | Doring | F01N 3/106 422/171 |
| 2009/0126353 | A1* | 5/2009 | Han | B01D 53/9436 60/297 |
| 2010/0005787 | A1 | 1/2010 | Hosoya et al. | |
| 2011/0060465 | A1* | 3/2011 | Cho | F01N 3/208 700/271 |
| 2011/0126525 | A1* | 6/2011 | Han | B01D 53/9418 60/287 |
| 2011/0229391 | A1 | 9/2011 | Paulus et al. | |
| 2012/0247092 | A1* | 10/2012 | Boorse | F01N 3/106 60/301 |
| 2013/0216441 | A1 | 8/2013 | Johansen | |
| 2015/0147250 | A1* | 5/2015 | Nigro | F01N 3/2066 423/212 |

FOREIGN PATENT DOCUMENTS

| JP | 004599989 | * | 10/2004 |
|---|---|---|---|
| JP | 2006-122792 A | | 5/2006 |
| JP | 4599989 | * | 12/2010 |
| RU | 2292236 C2 | | 1/2007 |
| RU | 2315657 C1 | | 1/2008 |
| WO | WO 2007/104382 A1 | | 9/2007 |
| WO | 2013178435 | * | 12/2013 |

OTHER PUBLICATIONS

Second Office Action received in CN 2015800110644 dated May 24, 2019.
Sebastian et al, "Characterisation of structured hydrolysis catalysts for urea-SCR", May 2007, pp. 99-103, vol. 42, No. 1-4, Publisher: Topics in Catalysis.

* cited by examiner

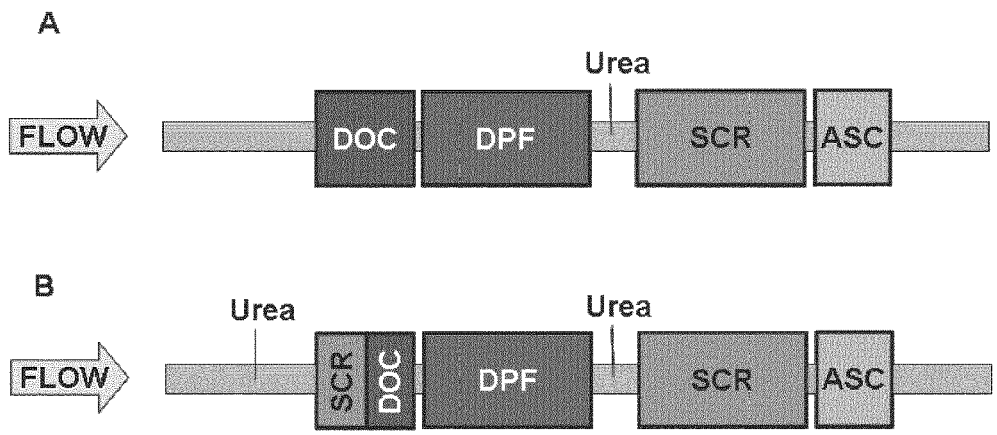
FIG.1
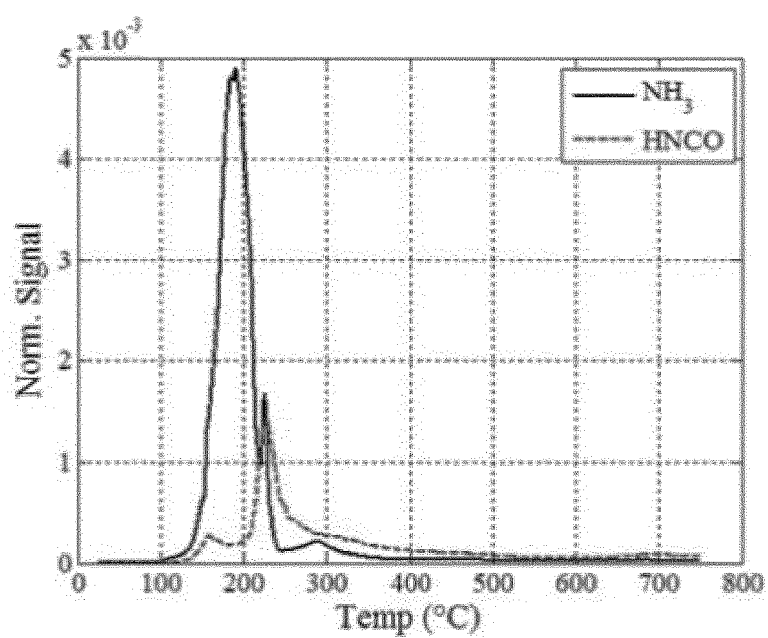
Fig. 2 NH3 and HNCO curve for a vanadia monolith impregnated with 32.5% urea/water solution, under 70 ml/min Ar sweep flow, a heating rate of 10 K/min and with a humidifier.

METHOD FOR THE CLEANING OF EXHAUST GAS FROM A COMPRESSION IGNITION ENGINE

The present invention relates to a method and system for reducing emission of nitrogen oxides (NOx) and particular matter being present in the exhaust from a lean burning internal compression ignition engine. In particular, the method and system of the invention provides an improved reduction of NOx during cold start of the engine.

Upcoming legislations request very low emissions from trucks and passenger cars. At the same time, the test cycles used start at relatively low temperatures. It is difficult to reduce the NOx in these cold cycles, especially when the so called after treatment systems are becoming more complicated with many different functionalities as hydrocarbon oxidation, soot filtration, NOx reduction and ammonia slip reduction. The most viable system consists of components in the following order, oxidation catalyst, soot filter, NOx reduction catalyst and ammonia slip catalyst.

The conventional exhaust system of modern cars and trucks with lean burning engines is equipped with a sequence of an oxidation catalyst, a particulate filter and a catalyst for the selective reduction of NOx (SCR) in presence of a reduction agent.

Oxidation catalysts active in the oxidation of volatile organic compounds and carbon monoxide and SCR catalysts are known in the art and disclosed in numerous publications.

Typically used particulate filters are the so called wall flow filters with a plurality of inlet and outlet channels. The inlet channels are closed at their outlet and the outlet channels are closed at their inlet, so that the gas flowing into the filter is forced through porous walls defining the channels, whereby particulate matter is filtered off the gas.

The most difficult emission to handle is nitrogen oxides (NOx). To achieve an acceptable cycle result, the NOx reduction needs to start early in the certification cycle. In the conventional exhaust gas cleaning systems as described above, the SCR catalyst is placed as the third exhaust gas cleaning unit in the systems and it takes some time after the engine has been started before this catalyst reaches its reaction temperature.

In the SCR treatment, ammonia is commonly employed as the reducing agent. Ammonia is a noxious compound and it is preferred to generate ammonia in situ by thermal decomposition of a urea solution being injected as ammonia precursor into the hot exhaust gas upstream the SCR catalyst.

Even if urea is innocuous and relatively easy to store on board of a vehicle, use of a liquid solution of urea as a precursor of ammonia reducing agent is problematic in particular in the cold start phase of the engine, i.e. when the exhaust gas temperature is below 200° C.

When injected as liquid solution in the exhaust gas, urea decomposes to ammonia in sufficient amounts for the SCR only at a temperature above about 150° C. The conventional SCR catalysts are, however, not very active until the temperature reaches 200° C.

The present invention solves this problem by arranging a SCR catalyst close to the engine and close coupled with a platinum containing oxidation catalyst. This SCR catalyst has additionally activity for hydrolyzing urea at lower temperatures and the oxidation catalyst SCR activity.

Platinum catalysts are active in SCR with ammonia. It is, however, difficult to decompose urea into ammonia in the gas phase at the temperatures where the platinum oxidation catalyst is an active SCR catalyst.

We have found that a vanadium oxide catalyst is effective in hydrolyzing urea before it reaches the oxidation catalyst in an exhaust gas cleaning system as described above.

Pursuant to the above findings and observations, this invention provides a method for the cleaning of an exhaust gas from a compression ignition engine, comprising the steps of injecting an aqueous urea solution into the exhaust gas; in a first mode of operation and at an exhaust gas temperature of between 150 and 220° C. catalytically hydrolysing the aqueous urea solution to an ammonia reducing agent by contact with a first catalyst comprising vanadium oxide supported on titania and subsequently removing part of nitrogen oxides contained in the exhaust gas by contacting the exhaust gas mixed with the ammonia reducing agent with a second catalyst arranged downstream of the first catalyst and comprising platinum on titania and/or alumina; and in a second mode of operation and at an exhaust gas temperature above 220° C. decomposing the aqueous urea solution to the ammonia reducing agent and removing a part of the nitrogen oxides contained in the exhaust gas by reaction with the ammonia reducing agent in presence of the first catalyst and subsequently oxidising hydrocarbons, carbon monoxide and ammonia further contained in the exhaust gas leaving the first catalyst by contacting the exhaust gas with the second catalyst.

The advantage of the method according to the invention is that the NOx reduction in the first catalyst close to the engine will heat up fast, so that the NOx reduction starts early in the test cycle. In order to save space it is suggested that the NOx reducing and the hydrocarbon reducing catalyst are integrated on one unit.

In the method according to the invention, a urea injector is arranged upstream of the first catalyst. The urea injection point can be used partly only at cold start or continuously during the operation of the engine to increase the overall performance of the total system.

As mentioned hereinbefore, Pt catalysts have an excellent low temperature SCR performance but the NOx reduction diminishes when the temperature reaches the ignition temperature for ammonia oxidation on the Pt catalyst, which results in ammonia decomposition before the NOx reduction can take place.

The vanadium oxide containing first catalyst actually begins to be active in the SCR in the same temperature range as oxidation of ammonia takes place on the Pt containing catalyst.

In an embodiment of the invention, the first catalyst further comprises tungsten oxide.

In still an embodiment of the invention, the second catalyst further comprises palladium.

The advantage of these embodiments is an increased SCR activity by including tungsten oxide in the first catalyst and improved temperature stability, when including palladium in the second catalyst.

In further an embodiment of the invention, an ammonia oxidation catalyst is layered on at least part of the second catalyst to remove remaining amounts of ammonia, which leave the upstream SCR. Thereby, ammonia slip from the SCR is substantially reduced. Preferred ammonia oxidation catalysts comprise platinum and zeolites promoted with iron and/or copper having a high activity in the oxidation of ammonia to innocuous nitrogen and water.

In still an embodiment, the first catalyst unit can further comprise a zeolite SCR catalyst in the first catalyst. Preferred zeolites are selected from the group of Y-zeolite, beta-zeolite, SAPO-zeolites and chabazites.

It is preferred in all the above embodiments that the first and second catalyst is arranged as close couple in a single catalyst unit.

The invention is described in more detail by reference to the drawings, in which FIG. 1A shows schematically a conventional diesel exhaust cleaning system and FIG. B a diesel exhaust cleaning system according to the invention;

FIG. 2 is a graph depicting the efficiency of the vanadium oxide/$TiO_2$ in the hydration of urea to ammonia at different temperatures; and FIGS. 3a and b show the activity of the close couplet vanadium oxide/$TiO_2$ (SCR) and Pt/$TiO_2$ (DOC) catalyst according to the invention at two different temperature intervals.

As shown in FIG. 1, the combined catalyst SCR/DOC in system B used in the method according to invention replaces the oxidation catalyst DOC in the conventional exhaust gas cleaning system A. The SCR/DOC catalyst has dual functions, one as close coupled SCR catalyst with vanadium oxide on $TiO_2$ and low temperature SCR using the Pt/$TiO_2$ of the second catalyst at low temperatures and then also using the vanadium oxide/$TiO_2$ catalyst for hydrolyzing urea to ammonia at low temperatures, which enables the use of urea as precursor of the ammonia reducing agent at lower temperatures down to 150° C.

FIG. 2 shows the graph of hydration of urea to ammonia and HNCO by contact with a vanadium oxide/$TiO_2$ catalyst. The catalyst was impregnated with a 32.5 vol % urea/water solution.

The catalyst was heated at a rate of 10 K/min and swept with 70 ml/min with argon and a humidifier.

As apparent from the FIG. 2, the vanadium oxide catalyst has a high activity in the hydration of urea to ammonia at a temperature between 150 and 220° C.

Figure 3B:
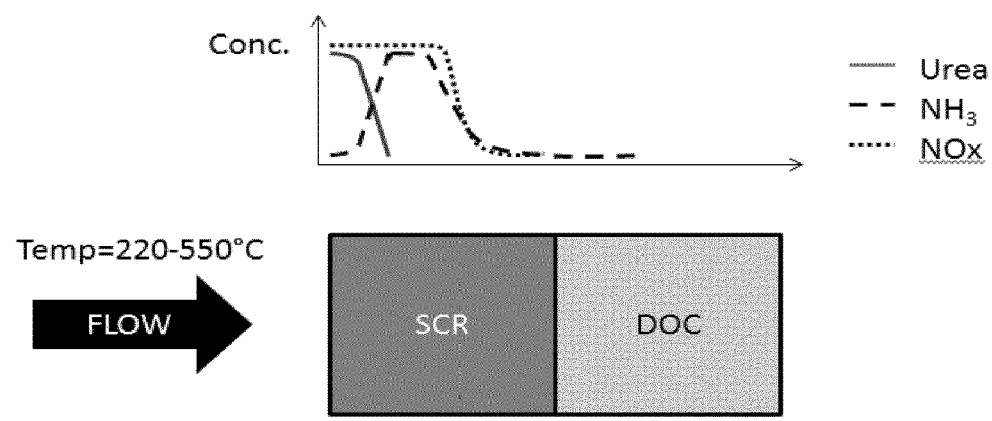

FIGS. 3a and 3b show the activity of the close couplet SCR/DOC catalyst according to the invention at two different temperature intervals.

As apparent from FIG. 3a, in a temperature range of between 150 and 220° C., a certain amount of urea is hydrolysed over the first vanadium oxide/$TiO_2$ (SCR) catalyst and ammonia is formed. Ammonia reacts then with NOx on the second Pt/$TiO_2$ (DOC) catalyst, which is SCR active in that temperature range. Both the NOx and ammonia concentration is reduced in the oxidation catalyst due to the SCR reaction.

When the temperature increases to 220° C. or higher as shown in FIG. 3b, the first SCR catalyst becomes more active. The reaction zone is moved towards the front of the catalyst and no SCR reaction occurs on the DOC catalyst. The formed ammonia concentration is reacted with NOx and both reactants are reduced due to the SCR reaction.

The invention claimed is:

1. A method for the cleaning of an exhaust gas from a compression ignition engine, comprising the steps of
injecting an aqueous urea solution into the exhaust gas upstream of a first catalyst, which is a selective catalytic reduction (SCR) catalyst comprising vanadium oxide supported on titania, said first catalyst is close coupled with a second catalyst, which is a diesel oxidation (DOC) catalyst comprising platinum on titania and/or alumina, and said first catalyst is arranged close to the compression ignition engine such that exhaust gas therefrom heats the first catalyst to a first temperature resulting in catalytic hydrolysis of aqueous urea into ammonia and then heats the first catalyst to a second temperature resulting in catalytic reduction of NOx, whereby
in a first mode of operation the exhaust gas comprising the aqueous urea solution reaches an exhaust gas temperature of between 150 and 220° C. and (a) the aqueous urea solution is catalytically hydrolysed to an ammonia reducing agent by contacting with the first catalyst and (b) a part of the nitrogen oxides contained in the exhaust gas are subsequently removed in the exhaust gas mixed with the ammonia reducing agent by contacting with the second catalyst arranged downstream of the first catalyst; and
in a second mode of operation the exhaust gas comprising the aqueous urea solution reaches an exhaust gas temperature above 220° C. and (a) the aqueous urea solution is decomposed to the ammonia reducing agent and a part of the nitrogen oxides contained in the exhaust gas is removed by reacting the part of the nitrogen oxides with the ammonia reducing agent in presence of the first catalyst and (b) subsequently oxidising hydrocarbons, carbon monoxide, and ammonia in the exhaust gas leaving the first catalyst by contacting the exhaust gas with the second catalyst.

2. The method of claim 1, wherein the first catalyst further comprises tungsten oxide.

3. The method of claim 1, wherein the second catalyst further comprises palladium.

4. The method of claim 1, wherein an ammonia oxidation catalyst is layered on at least part of the second catalyst.

5. The method of claim 4, wherein the ammonia oxidation catalyst comprises platinum and zeolites promoted with iron and/or copper.

6. The method of claim 1, wherein the first catalyst further comprises a zeolite SCR catalyst.

7. The method of claim 6, wherein the zeolite SCR catalyst comprises at least one of Y-zeolite, beta-zeolite, SAPO-zeolites and chabazites.

8. The method of claim 1, wherein the first catalyst and second catalyst are arranged in a single catalyst unit.

\* \* \* \* \*